(12) United States Patent
Girlando

(10) Patent No.: US 9,083,278 B2
(45) Date of Patent: Jul. 14, 2015

(54) DEVICE FOR TRANSFORMING ELECTROMAGNETIC IR ENERGY FROM SPATIALLY INCOHERENT, LOW-POWER DENSITY, BROAD-BAND RADIATION IN SPATIALLY COHERENT, HIGH-POWER DENSITY, QUASI-MONOCHROMATIC RADIATION

(75) Inventor: Giovanni Girlando, Catania (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 922 days.

(21) Appl. No.: 13/175,235

(22) Filed: Jul. 1, 2011

(65) Prior Publication Data

US 2012/0076162 A1 Mar. 29, 2012

(30) Foreign Application Priority Data

Jul. 5, 2010 (IT) .......................... VA2010A000052

(51) Int. Cl.
*H01L 35/30* (2006.01)
*H01S 3/04* (2006.01)
*H02S 99/00* (2014.01)

(52) U.S. Cl.
CPC ..................................... *H02S 99/00* (2013.01)

(58) Field of Classification Search
CPC ...... H01L 31/101; H01L 33/00; H04B 10/11; H02S 99/00
USPC ............................................ 372/36; 136/205
See application file for complete search history.

(56) References Cited

U.S. PATENT DOCUMENTS

| 3,970,839 | A | 7/1976 | Javan |
| 4,445,050 | A | 4/1984 | Marks ........................... 307/145 |
| 6,756,649 | B2 | 6/2004 | Moddel et al. |
| 6,927,387 | B2 | 8/2005 | Viktorovitch et al. |
| 7,126,151 | B2 | 10/2006 | Estes et al. |
| 7,728,538 | B2 | 6/2010 | D'Angelo et al. ......... 318/400.2 |
| 2004/0050415 | A1 | 3/2004 | Kucherov et al. ............. 136/252 |
| 2006/0261433 | A1 | 11/2006 | Manohara et al. |
| 2007/0240757 | A1 | 10/2007 | Ren et al. |
| 2008/0044979 | A1* | 2/2008 | Wells et al. .................. 438/424 |

(Continued)

FOREIGN PATENT DOCUMENTS

EP  1353387 A2  10/2003
EP  1699088 A1  9/2006

(Continued)

OTHER PUBLICATIONS

DiMatteo, P. et al., "Micron-gap Thermophotovoltaics", 2004, Thermophotovoltaic Generation of Electricity, Sixth Conference, American Institute of Physics 0-7354-0222-1/04, pp. 42-51.*

(Continued)

*Primary Examiner* — Tamir Ayad
(74) *Attorney, Agent, or Firm* — Allen, Dyer, Doppelt, Milbrath & Gilchrist, P.A.

(57) ABSTRACT

A device to be positioned between a heat source and a heat sink may transform infrared electromagnetic (IR-EM) energy exchanged therebetween from a first form to a second form. The device may include a pair of layers facing each other and having dielectric material with molecular excitability characteristics to produce the second form of IR-EM energy. The pair of layers may define a gap therebetween. The device may include a conversion circuit configured to convert the second form of IR-EM energy into electrical energy.

33 Claims, 13 Drawing Sheets

(56) References Cited

U.S. PATENT DOCUMENTS

| | | | |
|---|---|---|---|
| 2008/0216883 A1* | 9/2008 | Leneke et al. | 136/224 |
| 2009/0108202 A1 | 4/2009 | Gritz et al. | 250/338.1 |
| 2009/0136657 A1* | 5/2009 | Slafer | 427/124 |
| 2009/0308443 A1 | 12/2009 | Cutler | 136/256 |

FOREIGN PATENT DOCUMENTS

| | | | |
|---|---|---|---|
| WO | 2004/034473 | 4/2004 | H01L 29/06 |
| WO | 2005008710 A1 | 1/2005 | |
| WO | 2009152435 A1 | 12/2009 | |
| WO | 2010/010562 A2 | 1/2010 | |
| WO | 2010/010562 A3 | 1/2010 | H01L 31/0232 |

OTHER PUBLICATIONS

Francoeur, Mathieu et al., "Spectral Tuning of near-field radiative heat flux between two thin silicon carbide films", Feb. 5, 2010, J. Phys. D: Appl. Phys 43 (2010) 075501, pp. 1-12.*

Kotter, Dale K. et al., "Solar Nantenna Electromagnetic Collectors", Aug. 2008, Proceedings of the 2nd International Conference on Energy Sustainability ASME, ES 2008-54016, pp. 1-7.*

Joulain et al., "Surface electromagnetic waves thermally excited: Radiative heat transfer, coherence properties and Casimir forces revisited in the near field", Science Direct, Nov. 2004, pp. 59-112.

Marquier et al., "Engineering infrared emission properties of silicon in the near field and the far field", Science Direct, Jan. 2004, pp. 379-388.

Sarehraz, "Novel rectenna for collection of infrared and visible radiation", University of South Florida, Theses and Dissertations, Jun. 2005, pp. 1-162.

Sullivan et al., "Proposed Planar Scanning Tunneling Microscope Diode: Application as an Infrared and Optical Detector," IEEE Transactions on Electron Devices, vol. 36, No. 11, Nov. 1989, pp. 26592664.

Corkish et al., "Solar Energy Collection by Antennas," Solary Energy, vol. 73, No. 6, Jan. 2003, pp. 395-401.

Mayer et al., "Three-Dimensional Analysis of the Geometrical Rectifying Properties of Asymmetric Metal-Vacuum-Metal Junctions and Extension for Energy Conversion," Physical Review B 77, 085411, 2008, pp. 085411-1-085411-11.

Basu et al., Near-Field Radiation Calculated With an Imporved Dielectric Function Model for Doped Silicon, Journal of Heat Transfer, Feb. 2010, vol. 132, pp. 1-7.

Matyi et al., Nanoantenna Design for THZ-Band Retification, Wolfgang Porod Center for Naoscience and Technology, University of Notre Dame, USA, 2006, pp. 1-3.

* cited by examiner

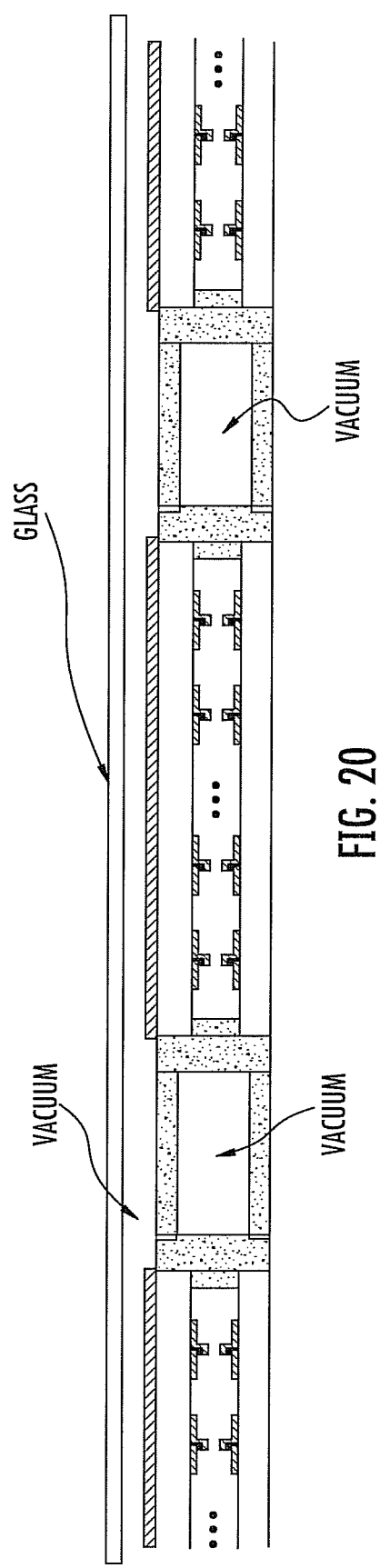

DEVICE FOR TRANSFORMING ELECTROMAGNETIC IR ENERGY FROM SPATIALLY INCOHERENT, LOW-POWER DENSITY, BROAD-BAND RADIATION IN SPATIALLY COHERENT, HIGH-POWER DENSITY, QUASI-MONOCHROMATIC RADIATION

FIELD OF THE INVENTION

This present invention relates to capturing infrared (IR) electromagnetic energy and converting it into electric energy with power antennas matched at the working frequency to a rectifier, in particular, the matching of the impedance on the rectifier (diode) and of the complex conjugate of the impedance on the capturing antenna of the IR radiation.

BACKGROUND OF THE INVENTION

FIG. 1 depicts a system called a "rectenna" (rectifier+antenna), which is generally studied for application based on the superficial waves present at the interface between two media of different characteristics, at working frequencies in the order of GHz. In Mohammad Sarehraz, "Novel Rectenna for Collection of Infrared and Visible Radiation," University of South Florida, March 2005, AC-DC power conversion yields greater than 80% have been measured for these systems at working frequencies in the range of microwaves (GHz).

Rectenna systems attain such a high conversion efficiency by satisfying the following three conditions: a) use of directional and monochromatic sources that do not disperse EM energy in large angles and on a broad frequency band, thus allowing an effective matching between antenna and rectifier; b) use of high-power density sources that minimize losses due to the offset (threshold) of the diodes used as a rectifier; and c) use of arrays of antennas for more effectively conveying the captured EM energy to the rectifier.

Lately, systems that may still be considered rectennas have been studied as possible transducers for sensing IR electromagnetic energy by converting it into AC electric signals that may be rectified, mainly as sensors of IR images. The antennas of a bidirectional array represent as many pixels of the sensor.

In a context of working frequency corresponding to an electromagnetic (EM) wavelength in the IR range, the block called MATCHING NETWORK, differently from typical rectenna systems, does not represent (and it could not do it) a real physical circuit, but conceptually, the necessary condition of providing for an adequate power matching between the capturing antenna and the rectifier, at the working frequency (TeraHertz). A typical system for converting IR radiations into electric energy is schematically depicted in FIG. 2. The system comprises two heat sources at different temperatures and the rectenna or a bidimensional array of rectennas (as in the case of a sensor for IR images) disposed on the surface of the source at lowest temperature (heat sink).

For such a system, it has been experimentally demonstrated that the IR electromagnetic radiation exchanged between the two bodies at different temperatures has characteristics that severely limit sensitivity and effectiveness of the EM energy conversion system of the IR radiation into an electric signal. In particular: a) the IR electromagnetic radiation substantially is a low-power density radiation; b) the IR electromagnetic radiation typically has a very broad bandwidth; and c) the radiation is spatially incoherent.

FIG. 3 depicts the emission spectrum of a black body at 300 K, i.e. of very broad bandwidth, the emission peak of which is centered in correspondence of wavelength of about 10 µm. For example, considering the temperature difference between the high temperature source ($T_1$=300 K) and the low temperature source ($T_2$=299 K) is equal to $\Delta T$=1K, it may be demonstrated that for the ideal case in which both sources are black bodies, the net thermal power per unit area that flows from the body at temperature $T_1$ to the body at temperature $T_2$ is about equal to 6 W/m². In these conditions, the voltage on the terminals of a dipole antenna or of an array of antennas that, for example, were capable of transferring 10% of the incident power to a rectifier supposed to be optimally power matched would be of only 23 µV.

In these conditions of electromagnetic IR radiation, an efficient rectenna system may require the use of diodes capable of working at IR frequencies with an almost ideal voltage/current characteristic, that is with a practically null threshold. Moreover, in the example of an area of coherence of the net IR radiation equal to a square having a side of 10 µm, were arbitrarily and very optimistically supposed. More realistically, the incident IR radiation is not spatially coherent and this may jeopardize the possibility of using arrays of antennas that may so increase the intensity of the cumulatively captured AC signal.

SUMMARY OF THE INVENTION

A device for transforming IR electromagnetic energy in form of spatially incoherent, low-power density, and broad band radiation into a spatially coherent, high-power density, and quasi-monochromatic radiation, may allow the realization of high sensitivity transducers and may make possible applications of IR electromagnetic energy conversion into electric energy with outstandingly large power yields, exploitable for energy harvesting from low enthalpy thermal wastes, for the production of electric energy from solar radiation and innumerable other useful applications.

BRIEF DESCRIPTION OF THE DRAWINGS

FIGS. 19 and 20 different embodiments of architectures of a device, according to the present invention, usable also for the realization of solar panels for transforming into electric energy the heat irradiated by a black body exposed to the sun.

DETAILED DESCRIPTION OF THE PREFERRED EMBODIMENTS

Figure 1:
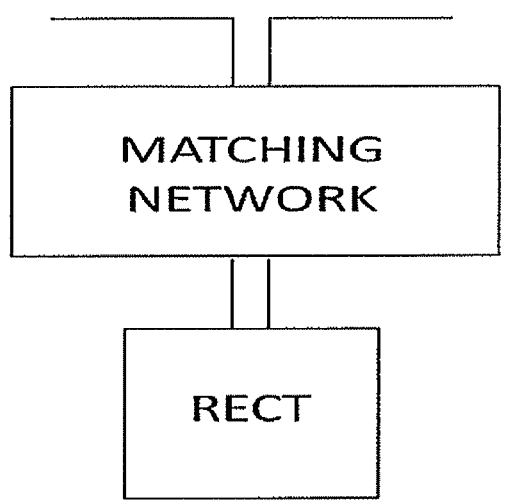
FIG. 1 is a schematic diagram of a rectenna, according to the prior art.
Figure 2:
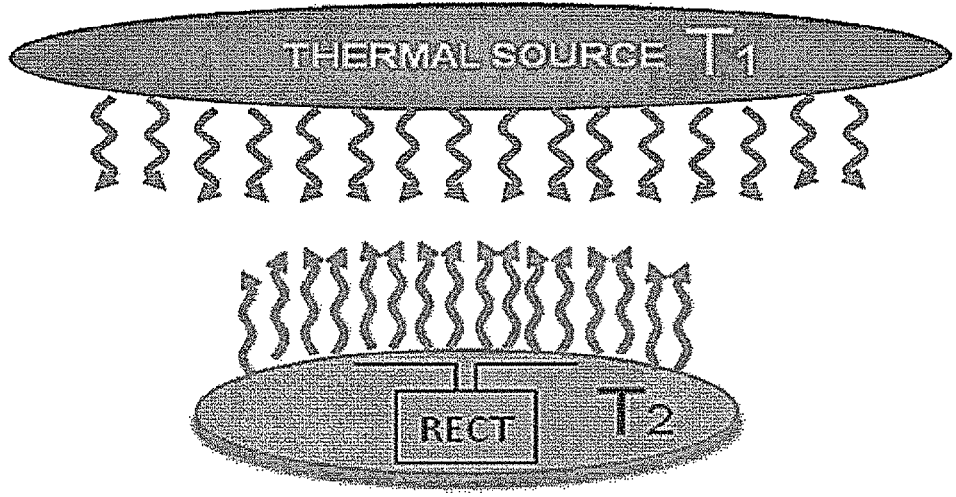
FIG. 2 shows a system for converting radiating energy into electric energy using a rectenna, according to the prior art.
Figure 3:
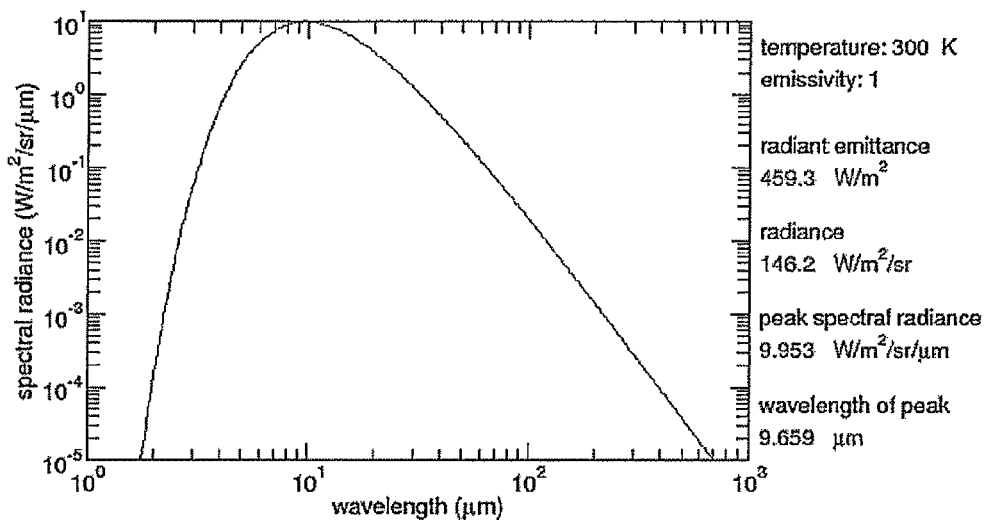
FIG. 3 is a black body emission diagram at room temperature, according to the prior art.
Figure 4:
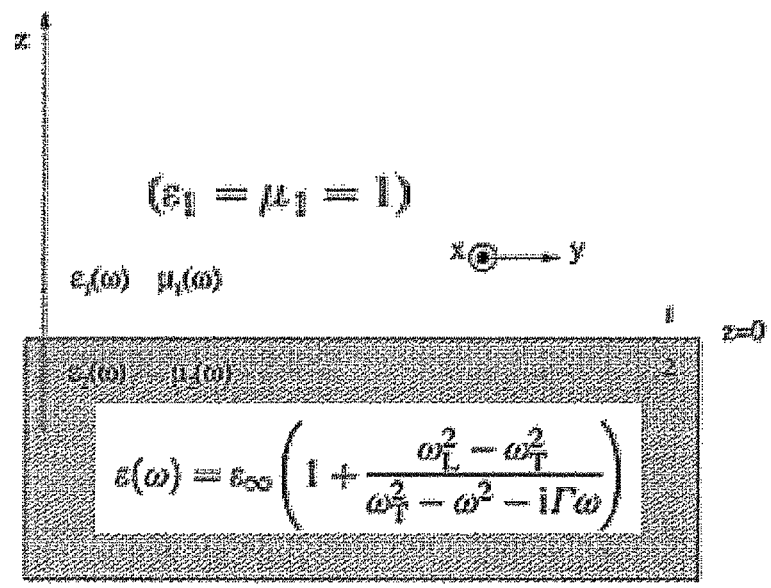
FIG. 4 shows the values of the dielectric constant at the interface between a polar substrate and another dielectric, according to the present invention.

A description of this present disclosure cannot leave out of consideration the concept of superficial wave, that is known in the scientific literature. Let us consider the separation interface between two dielectric mediums, the first of which is the vacuum (1) and the second is a polar material (2) as depicted in FIG. 4. A dielectric is called polar when its so-called dielectric "constant" depends from the working frequency ω, according to the mathematical model illustrated in FIG. 4 for the second material (2).

A superficial wave is a particular approach of the Maxwell equation that is obtained for the frequencies at which the following condition is satisfied: real part of $\epsilon_2(\omega)=-1$. This approach represents a signal that propagates along the separation surface between the two mediums (1) and (2) and that decreases exponentially in the direction perpendicular to the interface.

Figure 5:
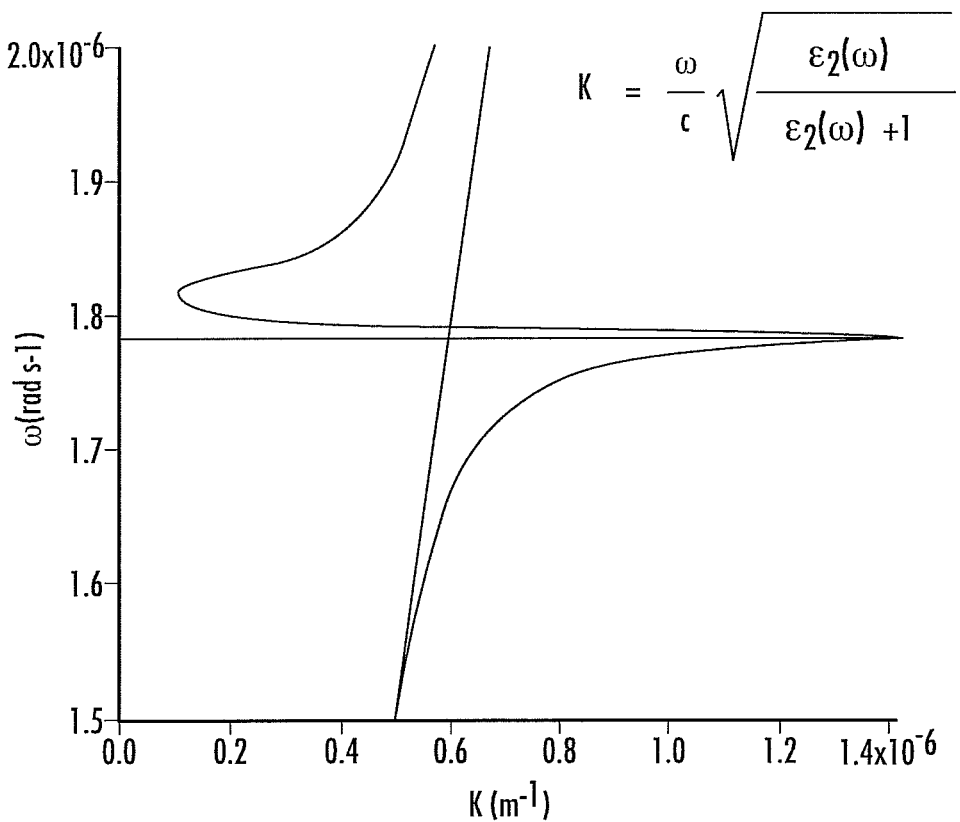
FIG. 5 is a graph of the dielectric constant at the interface between a polar substrate and vacuum when the module of the complex dielectric constant is equal to one, according to the present invention.
Figure 6:
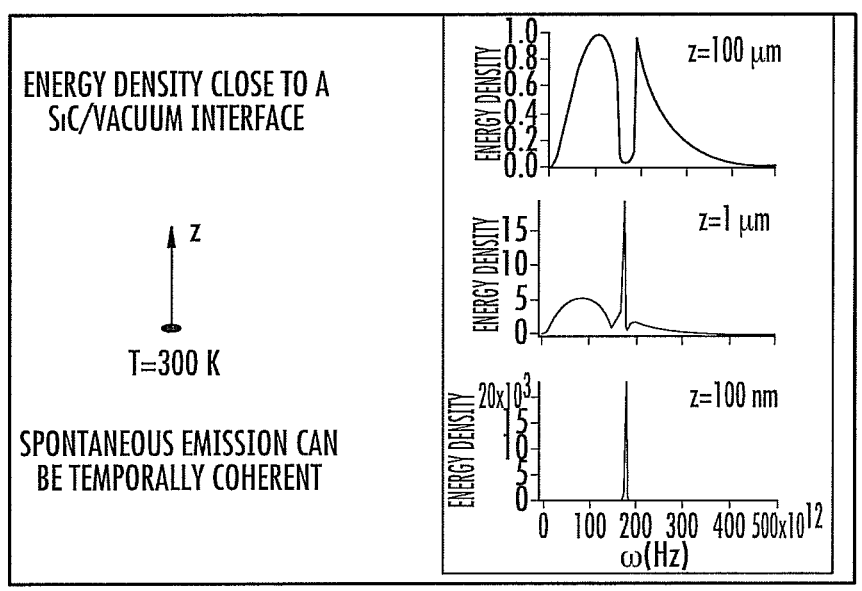
FIG. 6 shows emission spectra at the interface between a SiC substrate and vacuum at different distances from the interface, according to the present invention.

In this situation, the module of the wave vector K tends to infinity, as shown in FIG. 5. FIG. 6 shows emission spectra relative to an interface between a polar dielectric as SiC (at 300 K)/vacuum at different distances from the interface: 100 μm, 1 μm and 100 nm. At 100 μm, the frequency spectrum has a "hole" in correspondence of the frequency at which the surface wave occurs because of the fact that the wave is "forced" to stay on the surface and cannot propagate at distance.

Vice versa, closer to the interface (1 μm), the spectrum has a peak (always in correspondence of the frequency at which the surface wave occurs) that becomes extremely high (the intensity thereof is of about four order of magnitudes larger) at sub-micrometrical distances. At 100 nm the spectrum is practically "quasi-monochromatic."

Such a property of the IR spectrum at different distances from the interface may be noticed also for substances normally considered "amorphous," such as glass or amorphous silicon and numerous oxides and mixed oxides of two or more metals, that are materials compatible to be used in fabrication processes with planar definition techniques of structural micrometric and sub-micrometric features. In the figures, the indication "polar material" indicates that the material or surface layer of the plate of heat conducting material is excitable by heating at a sufficiently high temperature to irradiate IR quasi-monochromatic, spatially coherent and high-power density radiation.

Figure 7:
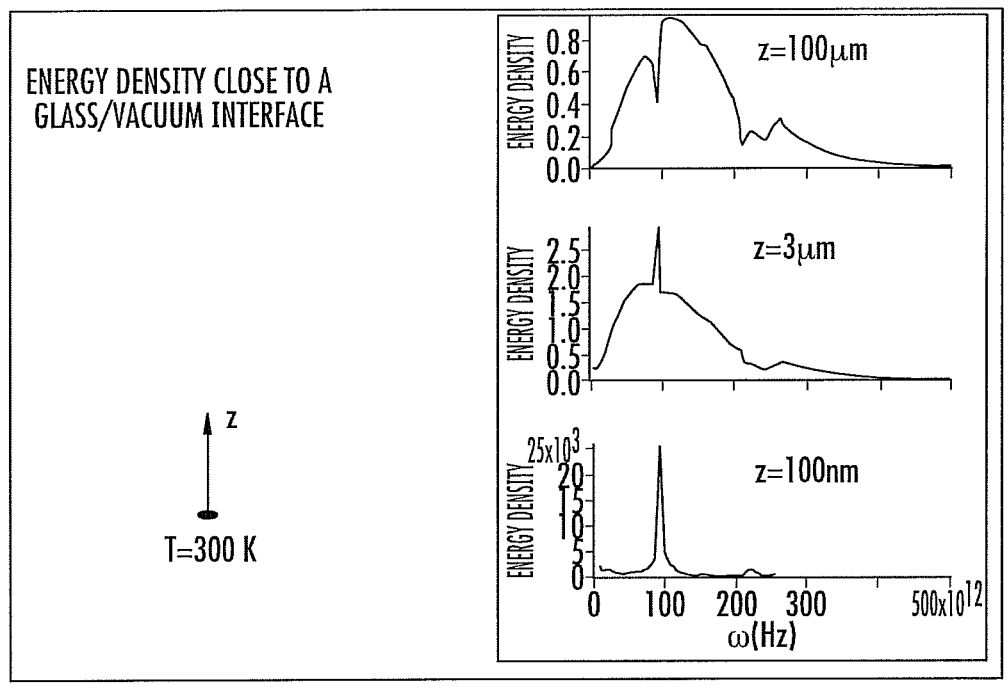
FIG. 7 shows emission spectra relative at the interface between a glass substrate and vacuum at different distances from the interface, according to the present invention.
Figure 8:
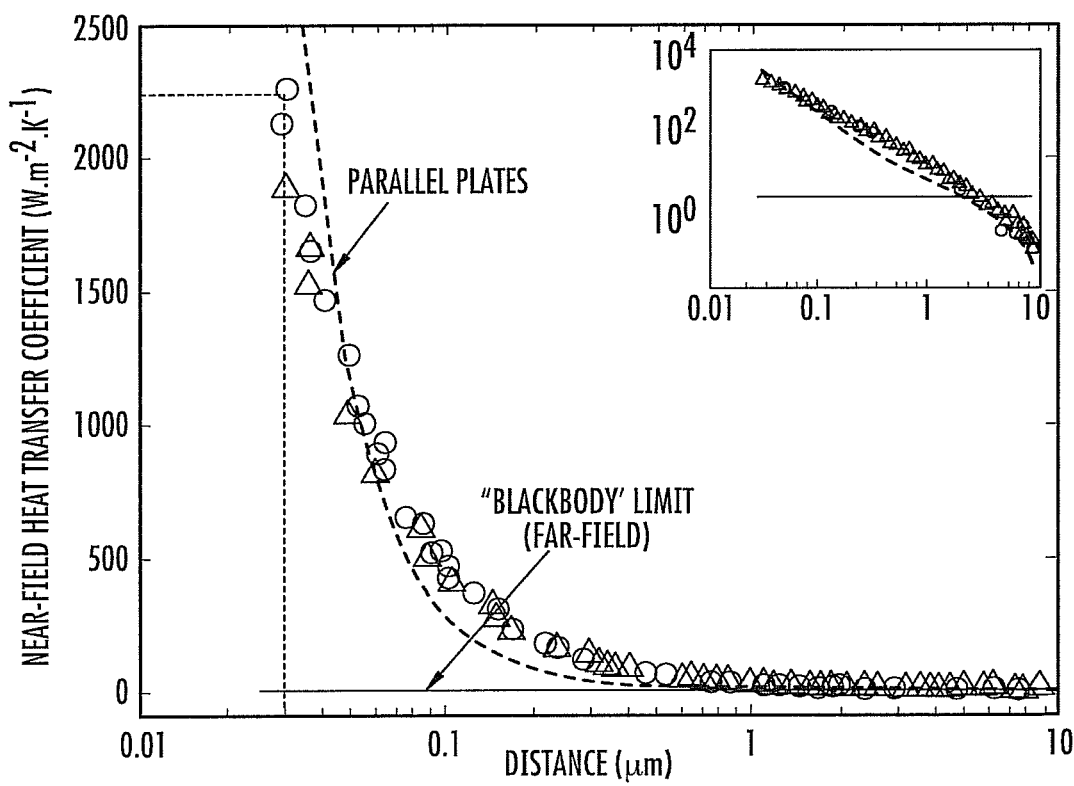
FIG. 8 is a graph of the thermal transfer coefficient in so-called "near-field" conditions, according to the present invention.

FIG. 7 shows emission spectra relative to glass interfaces at 300 K/vacuum for different distances from the interface (100 μm, 3 μm and 100 nm). For the interface SiC at 300 K/vacuum, at a distance of 30 nm from the interface, a thermal transfer coefficient equal to 2230 W/(m$^2$*K) has been measured, as shown in FIG. 8. See Karl Joulain, Jean-Philippe Mulet, Francois Marquier, Remi Carminati, Jean-Jacques Greffet; "Surface electromagnetic waves thermally excited: Radiative heat transfer, coherence properties and Casimir forces revisited in the near field," Surface Science Reports 57 (2005) 59-112. Considering, as for the previous example, a same temperature difference between the high temperature source ($T_1=300$ K) and the low temperature sink ($T_2=299$ K) equal to $\Delta T=1$ K, in the ideal case in which both sources are black bodies, the net thermal power per unit surface that flows from the body at temperature T1 towards the body at temperature T2 is 2230 W/m$^2$. In these conditions, the voltage on the terminals of a dipole antenna, supposed matched to the input of the rectifier, would be of about 11 mV. In practice, on the single dipole an increment of the generated voltage of about 500 is obtained.

Figure 9:
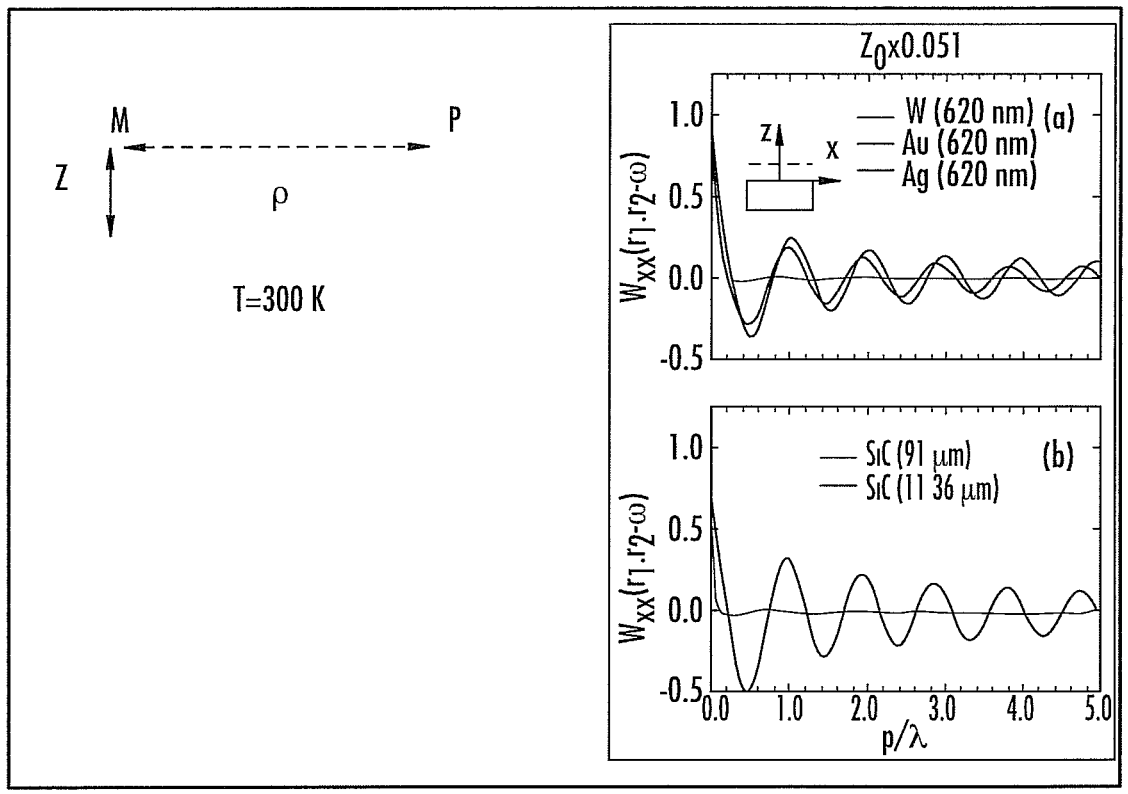
FIG. 9 shows the spatial distribution of the superficial waves parallel to the interface between the considered material and the vacuum, according to the present invention.
Figure 10:
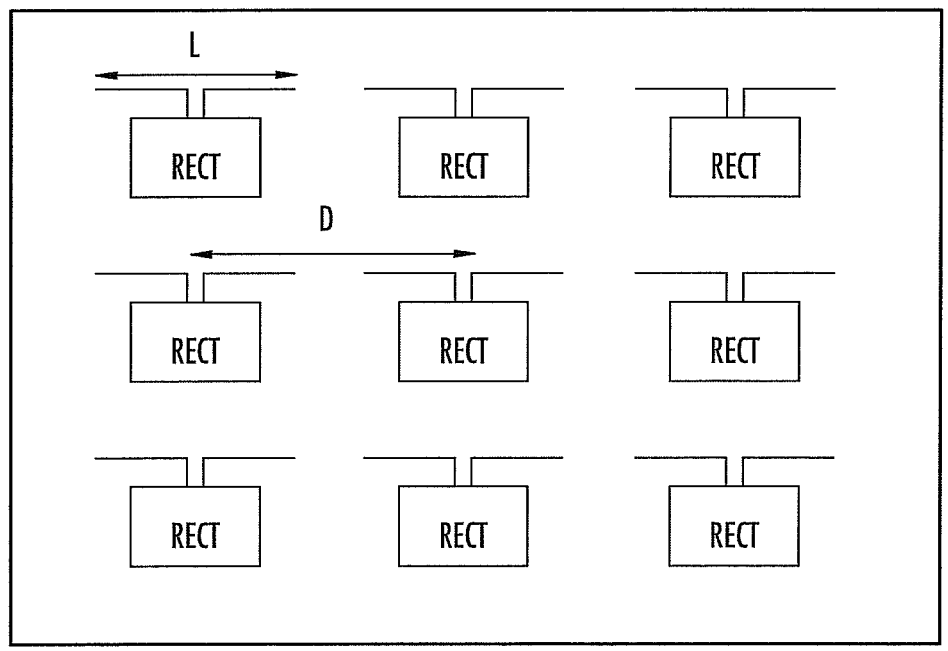
FIG. 10 depicts an array of rectennas, according to the present invention.
Figure 11:
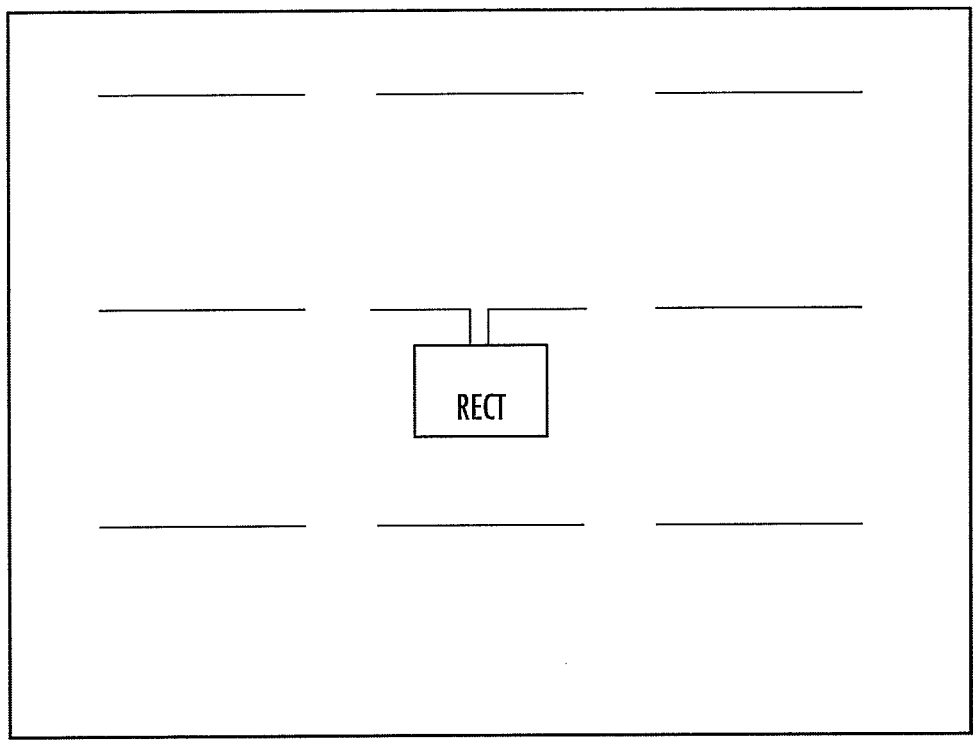
FIG. 11 shows an array of antennas connected to a single rectification device, according to the present invention.

Further considering that it has been demonstrated in Sarehraz that superficial waves keep a spatial coherence for several tens of wavelength, as shown in FIG. 9, it is possible to deploy an array of rectennas, as schematized in FIG. 10 or arrays of capturing antennas associated to a rectenna, as in FIG. 11, for further increasing the voltage available on the terminals of the antenna and thus simplifying the action of the rectifier. Considering the deterministic (periodic) nature of the steady superficial waves, numerous identical superficial structures (modules) replicated over a wide surface may be realized for collecting the "monochromatic" EM power available at the interface between two propagation mediums of the IR radiation and for increasing the intensity of the electric signal at the input of the rectifier.

Figure 12:
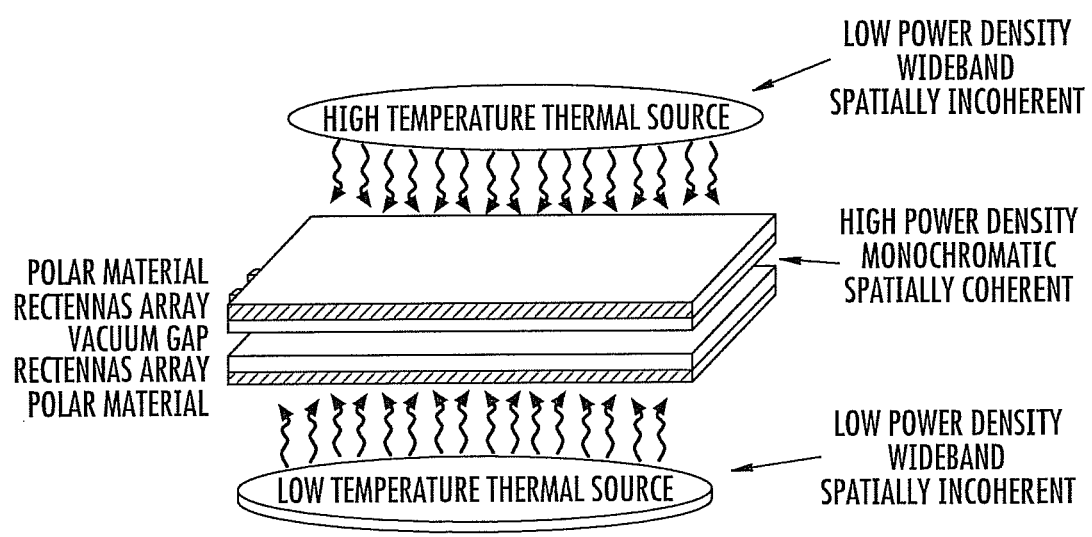
FIG. 12 depicts an architecture of a system, according to the present invention.

By summarizing, the scheme of the system of this present disclosure is shown in FIG. 12. It is an efficient device that may be realized optionally with perfectly bidimensional characteristics by realizing rectennas on the surfaces faces of both plates instead of only one surface face. The heat source, interposable between a heat source and a heat sink, is capable of carrying out a transformation of IR electromagnetic energy, typically in form of spatially incoherent, low-power density and broad-band radiation, into a spatially coherent, high-power density and quasi-monochromatic radiation.

The device of this present disclosure has two parallel planar surfaces, one facing the other, made of a dielectric material with characteristics of molecular excitability such to produce spatially coherent, high-power density and quasi-monochromatic infrared radiation, belonging respectively to two juxtaposed heat conducting plates, at different temperature, and defining between them a substantially evacuated gap of sub-micrometric thickness between the facing surfaces. Rectennas adapted to capture the spatially coherent infrared radiation, at high-power density and quasi-monochromatic, arranged or defined on the surface or in the excitable solid material belonging to the plate at lower temperature, convert the monochromatic IR electromagnetic energy into electric voltage for sensing modulation signals of the thickness of the evacuated gap space or for producing electric power.

Figure 13:
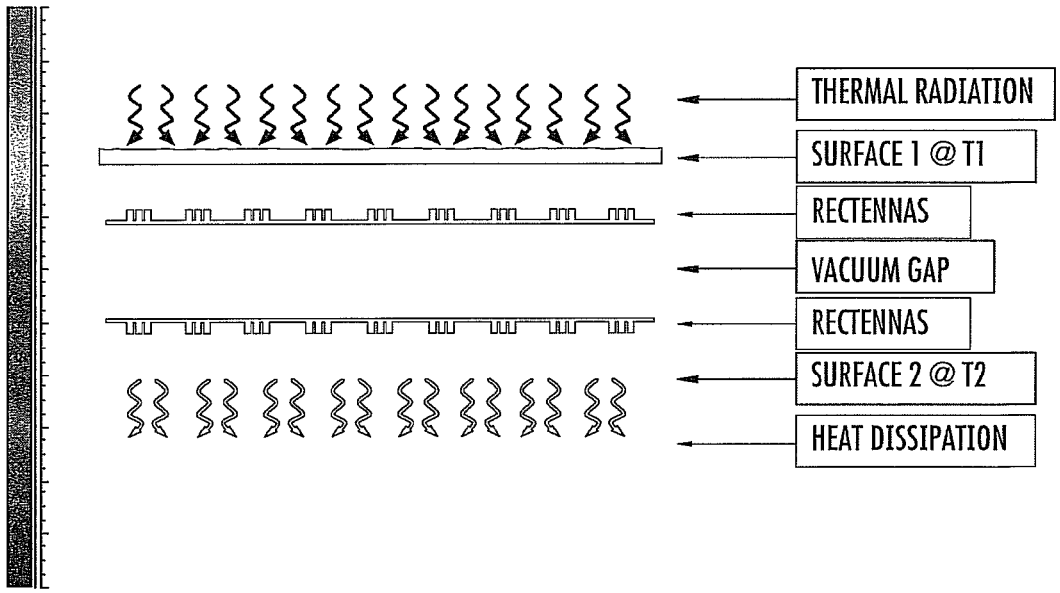
FIGS. 13 and 14 are schematic diagrams of a system, according to the present invention, in two different thermal conditions.
Figure 14:
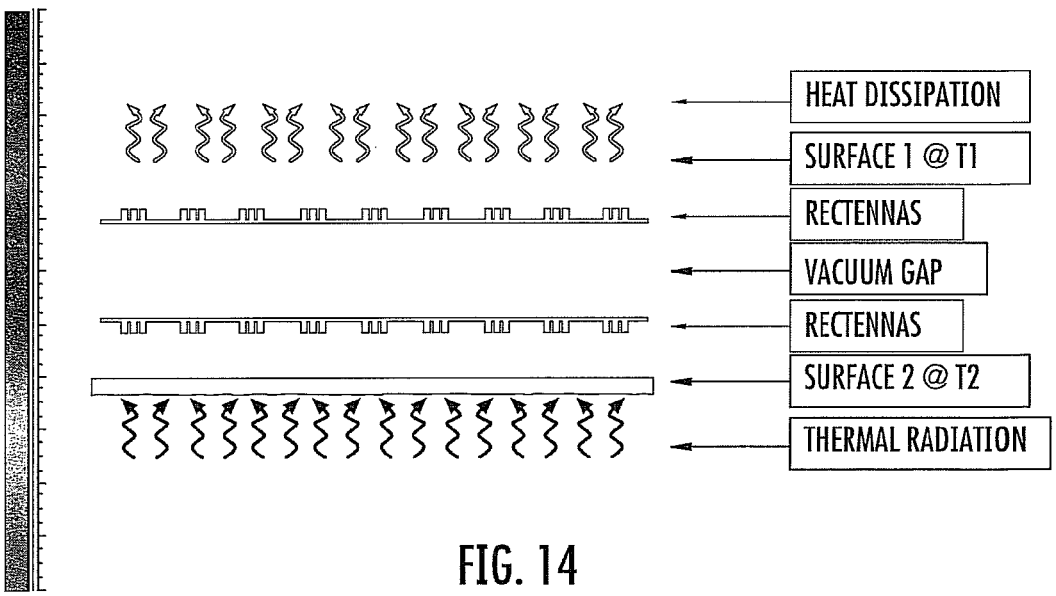
Figure 15:
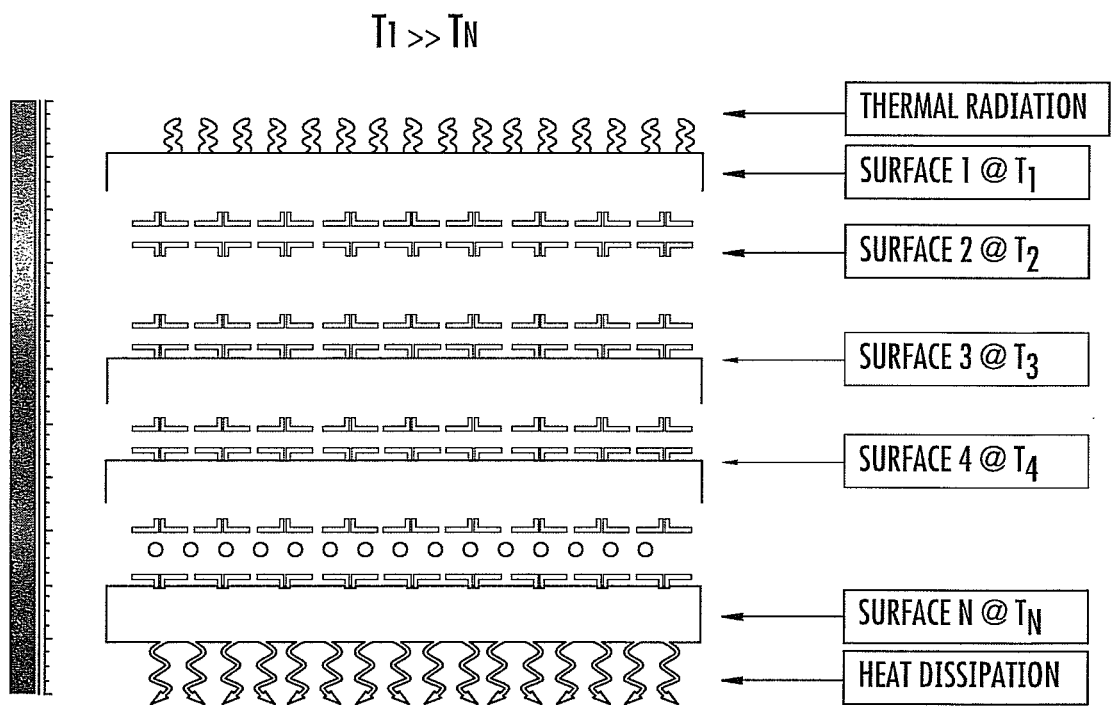
FIG. 15 depicts another system having a multi-stage architecture, according to the present invention.

The structure of the device of this present disclosure may be realized for a bi-directional use, as shown in FIGS. 13 and 14, by arranging or defining the rectennas at the surface or embedded in the excitable solid material of both plates facing each other. Moreover, if a large thermal gradient between a heat source and a heat sink of a practically unlimited dissipation capacitance is available, it is possible to interpose a plurality of devices in cascade. In other words, a multi-stage device, comprises a stack comprising intermediate bi-front heat conductive plates having the layer of the excitable dielectric material on both sides and at the surface or embedded in the superficial layer facing towards the source of which rectennas are present for converting quasi-monochromatic radiation into electric energy. Thus, this defines a plurality of evacuated spacing gaps between adjacent plates of the stack, as shown in FIG. 15.

Figure 16:
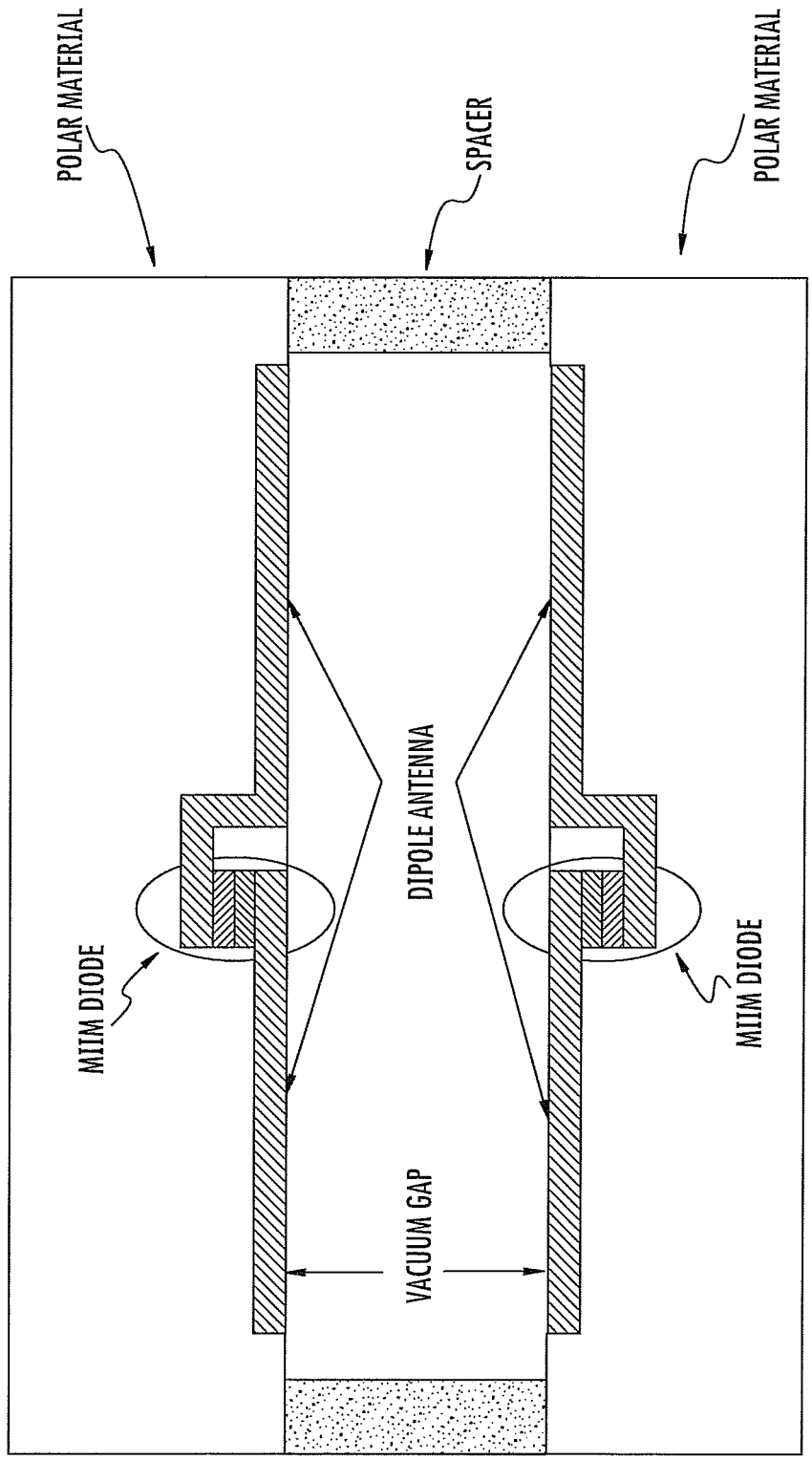
FIGS. 16, 17 and 18 are schematic diagrams of integrated structures of rectennas, according to the present invention.
Figure 17:
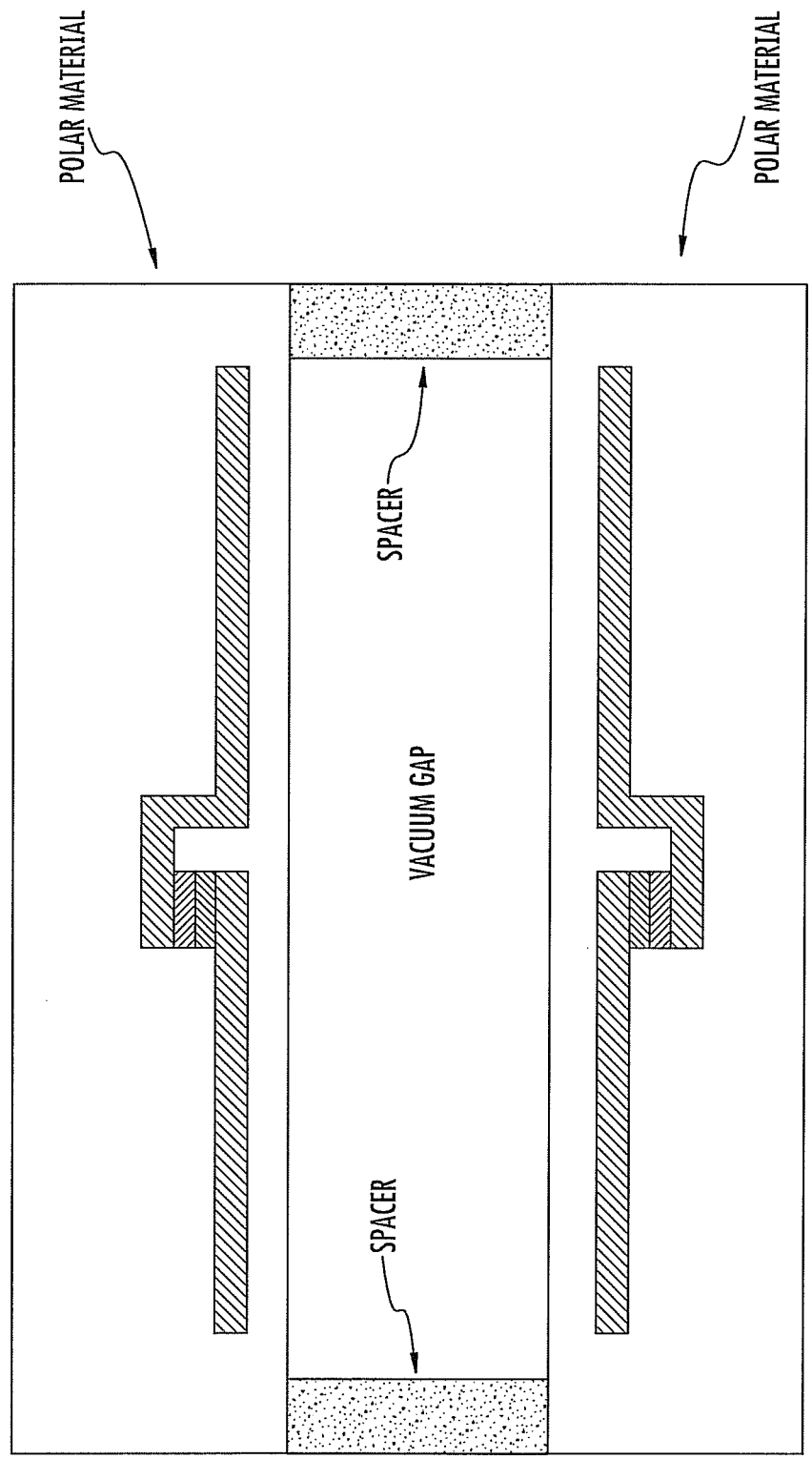
Figure 18:
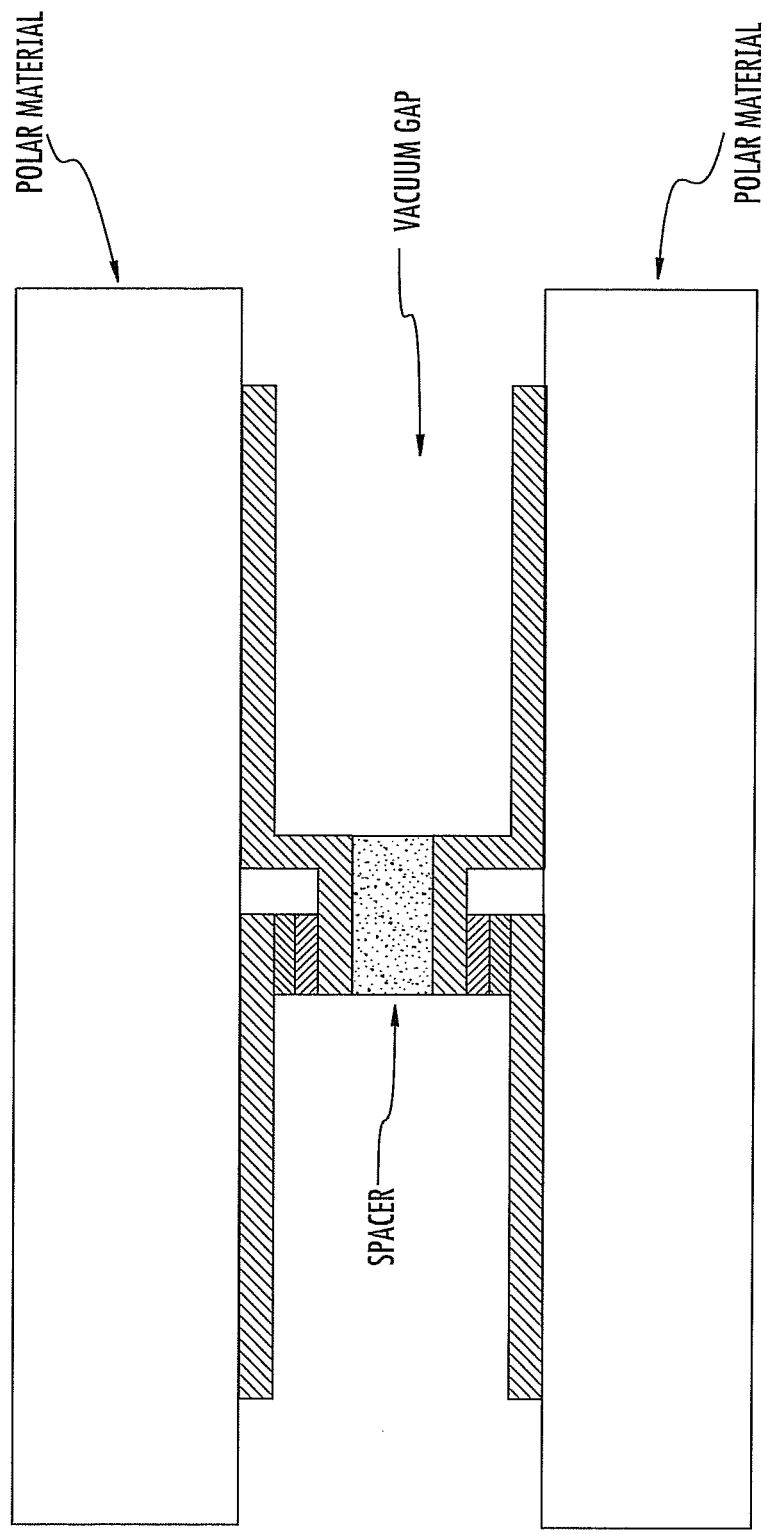

FIGS. 16, 17 and 18 show exemplary structures of rectenna integrable on a superficial layer of excitable dielectric material (i.e. having polar characteristics) of a substrate that is a good heat conductor, for example, a silicon wafer with a superficial layer of SiC or of amorphous silicon or of glass. The two arms of the dipole antenna of micrometric size geometrically defined on the basis of the wavelength of the monochromatic IR radiation generated by the excited dielectric layer opposed to the rectennas structures, may be of a metal such as gold, aluminum, titanium, molybdenum, or of doped silicon or even of materials commonly definable as dielectric but that interact with EM waves at IR wavelength, capable of being excited by the incident radiation and generate an AC voltage difference on the terminals of the dipole antenna.

The plurality of dipole antennas of micrometric size are spaced among themselves by several micrometers and are connected to a rectifying structure. In the depicted example, a MIIM diode structure may be extended for a portion or for the whole width of the device, rectifying the energy captured by the plurality of antennas connected to the rectifier and converting it into DC electric power. The rectifying diodes may commonly charge one or more tank capacitors for supplying an electric load that may comprise a DC-DC converter and eventually storage batteries of the produced electric energy or an inverter suitably interfaced with the public electric mains.

FIG. 17 shows an alternative embodiment of rectenna structures in a completely buried form, in the layer of excitable dielectric material, constituting the definition surfaces of the micrometric vacuum gap space by virtue of the fact that superficial waves also extend below the surface of the dielectric layer. FIG. 18 shows a further alternative embodiment of the rectennas arranged in the vacuum gap space, using spacers between facing rectenna structures.

Figure 19:
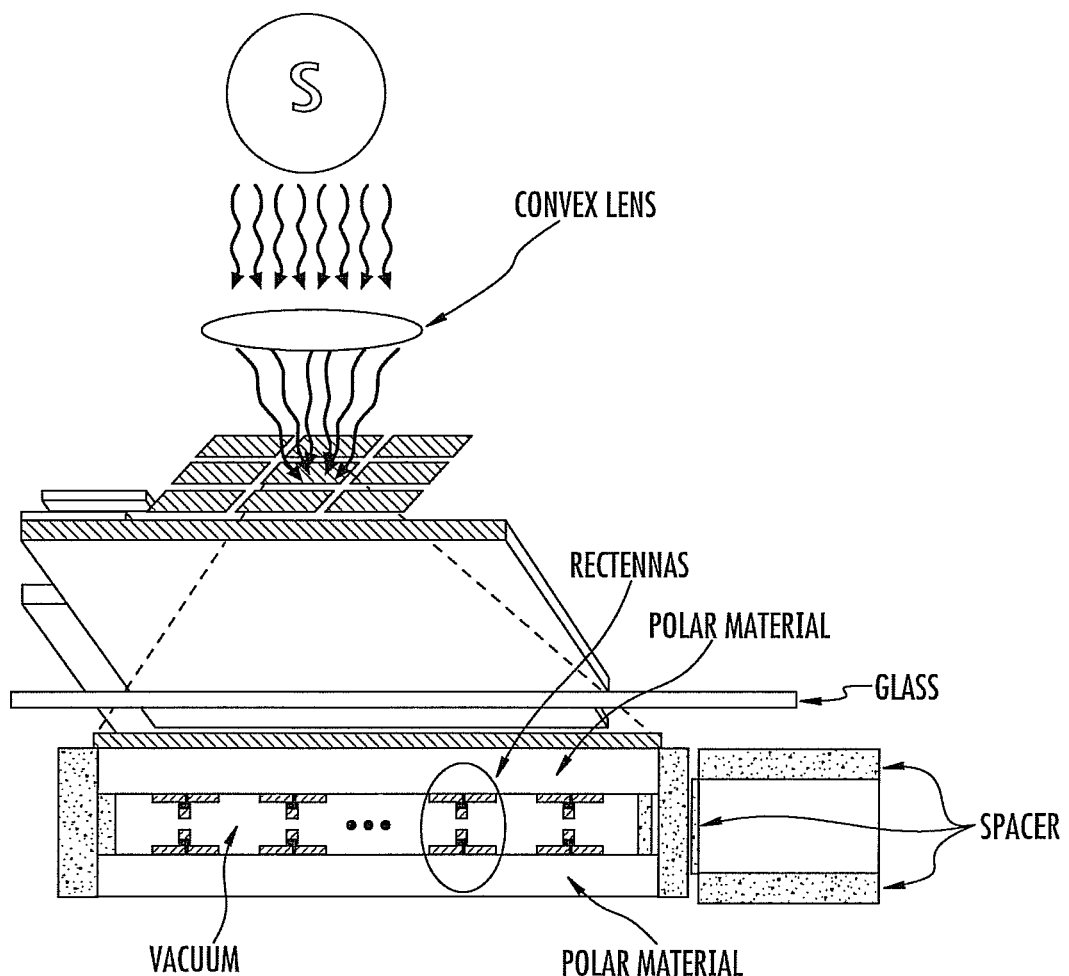

FIG. 19 shows the architecture of a system for converting solar energy through a primary conversion to heat of the solar radiation by equipping a first heat conducting plate having a "black body" like absorbing surface. The front plate with black body surface may represent the first of a stack of similar heat conduction plates, the last of which may have practically unlimited heat sink properties (being for example cooled by the refrigerating fluid of a heat exchanger for heating domestic water or for dissipating heat in the atmosphere for example through a finned metallic heat sink). Thus, this constitutes a multi-stage device as in the example shown in FIG. 15, and in which arrays of rectennas may be present only on the surfaces, looking toward the sun of the vacuum gap spaces between the plates of the stack or on both surfaces.

As schematically shown in FIG. 19, convergent lenses may be disposed above "black body" absorption areas of respective multi-stage devices (conversion modules) in order to concentrate solar radiation and increase the thermal power incident on each multi-stage conversion module. A panel may be structured as shown in the detailed view and may comprise a protection glass layer for creating a greenhouse effect for enhancing absorption of solar radiation and its conversion into heat, i.e. then transmitted by conduction to a first interface between the surface of excitable dielectric material of the first plate of the first vacuum gap space for transforming IR radiation exchanged between the first and the second plate into quasi-monochromatic, spatially coherent and high-power density radiation that is captured in this case by both arrays of rectennas respectively on the facing surfaces of the vacuum gap space.

Supposing a vacuum gap space of 30 nm, the thermal conductivity (C) per unit surface would be 2.23 kW/(m$^2$*K). If the power density of the solar radiation is 1 kW/m$^2$, under steady state conditions, the thermal gradient between the two plates may be 0.45 K and use of a multi-stage device may allow multiplication of the electric power yield obtainable by each device (vacuum gap space equipped with the rectenna structures) of the stack.

That which is claimed:

1. A device to be positioned between a heat source and a heat sink for transforming infrared electromagnetic (IR-EM) energy exchanged therebetween from a first form to a second form, the device comprising:
    at least one pair of layers facing each other and comprising polar dielectric material having molecular excitability characteristics so that said at least one pair of layers is configured to produce the second form of IR-EM energy;
    said at least one pair of layers defining a vacuum gap therebetween, the vacuum gap being between 0.01-0.12 μm in thickness; and
    a conversion circuit configured to convert the second form of IR-EM energy into electrical energy and comprising a plurality of rectennas in the vacuum gap.

2. The device of claim 1 further comprising at least one pair of heat conduction layers associated respectively with said at least one pair of layers, each heat conduction layer being at a different temperature.

3. The device of claim 1 wherein said at least one pair of layers comprises at least one pair of planar layers.

4. The device of claim 2 wherein said at least one pair of heat conduction layers comprises at least one pair of heat conduction plates.

5. The device of claim 1 wherein said conversion circuit is configured to generate an acoustic-mechanical signal of modulation of a thickness of the vacuum gap.

6. The device of claim 1 wherein the first form of IR-EM energy comprises spatially incoherent, low-power density, and broad-band IR-EM energy.

7. The device of claim 1 wherein the second form of IR-EM energy comprises spatially coherent, high-power density, and quasi-monochromatic IR-EM energy.

8. The device of claim 2 wherein said plurality of rectennas are adjacent the polar dielectric material of the heat conduction layer at a lower temperature, and is configured to capture and convert the second form of IR-EM energy into the electrical energy and to be coupled to an external circuit.

9. The device of claim 2 wherein said plurality of rectennas are configured to transform energy bidirectionally.

10. The device of claim 1 wherein the polar dielectric material comprises silicon carbide (Sic).

11. The device of claim 2 wherein said at least one pair of heat conduction layers each comprises a material different than the polar dielectric material.

12. The device of claim 2 wherein said plurality of rectennas are micrometric structures, each rectenna comprising conducting arms to define a dipole to be excited by the second form of IR-EM energy and a diode coupled to said dipole.

13. The device of claim 1 further comprising a microelectromechanical (MEM) device in the vacuum gap.

14. The device of claim 2 wherein said at least one pair of layers and said at least one pair of heat conduction layers comprises respective pluralities thereof in stacked arrangement and defining a plurality of vacuum gaps therebetween.

15. A device to be positioned between a heat source and a heat sink for transforming infrared electromagnetic (IR-EM) energy exchanged therebetween from a first form to a second form, the device comprising:
- at least one pair of planar layers facing each other and comprising polar dielectric material having molecular excitability characteristics so that said at least one pair of planar layers is configured to produce the second form of IR-EM energy;
- at least one pair of heat conduction layers associated respectively with said at least one pair of planar layers, each heat conduction layer being at a different temperature;
- said at least one pair of planar layers defining a vacuum gap therebetween, the vacuum gap being between 0.01-0.12 µm in thickness; and
- a conversion circuit configured to convert the second form of IR-EM energy into electrical energy and comprising a plurality of rectennas in the polar dielectric material.

16. The device of claim 15 wherein said at least one pair of heat conduction layers comprises at least one pair of heat conduction plates.

17. The device of claim 15 wherein said conversion circuit is configured to generate an acoustic-mechanical signal of modulation of a thickness of the vacuum gap.

18. The device of claim 15 wherein the first form of IR-EM energy comprises spatially incoherent, low-power density, and broad-band IR-EM energy.

19. The device of claim 15 wherein the second form of IR-EM energy comprises spatially coherent, high-power density, and quasi-monochromatic IR-EM energy.

20. A method of transforming infrared electromagnetic (IR-EM) energy exchanged between a heat source and a heat sink from a first form to a second form, the method comprising:
- transforming the first form of IR-EM energy into the second form of IR-EM energy in a vacuum gap between at least one pair of layers facing each other and comprising polar dielectric material having molecular excitability characteristics to produce the second form of IR-EM energy, the vacuum gap being between 0.01-0.12 µm in thickness; and
- converting in the vacuum gap the second form of IR-EM energy into electrical energy using a plurality of rectennas.

21. The method of claim 20 wherein the at least one pair of layers is associated with at least one pair of heat conduction layers at different temperatures.

22. The method of claim 20 further comprising accumulating the electrical energy in a capacitor connected to the plurality of rectennas.

23. The method of claim 20 wherein the at least one pair of layers comprises at least one pair of planar layers.

24. The method of claim 20 wherein the at least one pair of heat conduction layers comprises at least one pair of heat conduction plates.

25. The method of claim 20 further comprising converting an alternating current (AC) signal generated by the plurality of rectennas into direct current (DC) electrical energy.

26. The method of claim 20 wherein the first form of IR-EM energy comprises spatially incoherent, low-power density, and broad-band IR-EM energy.

27. The method of claim 20 wherein the second form of IR-EM energy comprises spatially coherent, high-power density, and quasi-monochromatic IR-EM energy.

28. A device to be positioned between a heat source and a heat sink for transforming infrared electromagnetic (IR-EM) energy exchanged therebetween from a first form to a second form, the device comprising:
- a plurality of pairs of layers, each pair facing each other and comprising polar dielectric material having molecular excitability characteristics to produce the second form of IR-EM energy, each pair of layers defining a vacuum gap therebetween;
- a plurality of pairs of heat conduction layers associated respectively and being in stacked arrangement with said plurality of pairs of layers, each heat conduction layer being at a different temperature; and
- a conversion circuit configured to convert the second form of IR-EM energy into electrical energy and comprising a plurality of rectennas in each vacuum gap.

29. The device of claim 28 wherein each pair of layers comprises a pair of planar layers.

30. The device of claim 28 wherein each pair of heat conduction layers comprises a pair of heat conduction plates.

31. The device of claim 28 wherein said conversion circuit is configured to generate an acoustic-mechanical signal of modulation of a thickness of the gap.

32. The device of claim 28 wherein the first form of IR-EM energy comprises spatially incoherent, low-power density, and broad-band IR-EM energy.

33. The device of claim 28 wherein the second form of IR-EM energy comprises spatially coherent, high-power density, and quasi-monochromatic IR-EM energy.

* * * * *

UNITED STATES PATENT AND TRADEMARK OFFICE
CERTIFICATE OF CORRECTION

PATENT NO.        : 9,083,278 B2
APPLICATION NO.   : 13/175235
DATED             : July 14, 2015
INVENTOR(S)       : Giovanni Girlando It is certified that error appears in the above-identified patent and that said Letters Patent is hereby corrected as shown below:

In the claims

Column 6, Line 54,    Delete: "(Sic)"
Claim 10              Insert --(SiC)--

Signed and Sealed this
Fifteenth Day of December, 2015

Michelle K. Lee
*Director of the United States Patent and Trademark Office*